United States Patent [19]

Martinie

[11] Patent Number: 5,709,483
[45] Date of Patent: Jan. 20, 1998

[54] BEARING ASSEMBLY UTILIZING IMPROVED CLAMPING ARRANGEMENT

[75] Inventor: Howard M. Martinie, Simpsonville, S.C.

[73] Assignee: Reliance Electric Industrial Company, Cleveland, Ohio

[21] Appl. No.: 683,945

[22] Filed: Jul. 19, 1996

[51] Int. Cl.$^6$ ........................................ F16C 27/04
[52] U.S. Cl. .......................... 384/538; 384/585; 403/370
[58] Field of Search ............................. 384/537, 538, 384/540, 541, 585; 403/369, 370

[56] References Cited

U.S. PATENT DOCUMENTS

| | | | |
|---|---|---|---|
| 738,445 | 9/1903 | Hoffmann | 384/540 |
| 1,526,008 | 2/1925 | Olson | 384/540 |
| 1,583,562 | 5/1926 | Stenner | 384/538 |
| 1,843,463 | 2/1932 | Tawresey . | |
| 2,043,272 | 6/1936 | Wallgren . | |
| 2,118,885 | 5/1938 | Hughes . | |
| 2,650,867 | 9/1953 | Spieth | 384/540 |
| 3,033,597 | 5/1962 | Miller . | |
| 3,497,274 | 2/1970 | Yardley . | |
| 3,807,820 | 4/1974 | Schuhmann | 384/538 |
| 3,953,142 | 4/1976 | Price et al. | 403/371 |
| 4,288,172 | 9/1981 | Livesay et al. | 403/317 |
| 4,345,851 | 8/1982 | Soussloff | 403/369 |
| 4,364,687 | 12/1982 | Adell | 403/370 |
| 4,647,230 | 3/1987 | Friedrich et al. | 384/510 |
| 5,009,539 | 4/1991 | Muellenberg | 403/370 |
| 5,011,306 | 4/1991 | Martinie | 384/585 |
| 5,067,847 | 11/1991 | Muellenberg | 403/370 |
| 5,269,607 | 12/1993 | Lawson | 384/538 |
| 5,373,636 | 12/1994 | Martinie | 29/898.08 |
| 5,417,500 | 5/1995 | Martinie | 384/537 X |
| 5,489,156 | 2/1996 | Martinie | 384/538 |

FOREIGN PATENT DOCUMENTS

| | | |
|---|---|---|
| 0235366A2 | 9/1987 | European Pat. Off. . |
| 0328759A1 | 8/1989 | European Pat. Off. . |
| 0424584A1 | 5/1991 | European Pat. Off. . |
| 897776 | 10/1953 | Germany . |
| 15398 | of 1909 | United Kingdom . |
| 2120360 | 11/1983 | United Kingdom . |

OTHER PUBLICATIONS

An article entitled "Keyless Bushing Keeps Shafts Strong," *Machine Design*, vol. 65, No. 12, p. 34 (Jun. 25, 1993).

*Primary Examiner*—Thomas R. Hannon
*Attorney, Agent, or Firm*—Craig N. Killen; John M. Miller; John J. Horn

[57] ABSTRACT

A bearing assembly including an improved clamping arrangement for effecting securement to a rotating shaft. The bearing assembly includes a bearing inner ring member and a bearing outer ring member having a plurality of bearing elements located therebetween. A second extension portion extends from the greater diameter end of a tapered inner surface defined in the inner ring member, the second extension portion defining a circumferential receiving groove. A tapered adapter having a tapered outer surface, generally complementary to the tapered inner surface, is received in the inner ring member. The tapered adapter includes a first extension portion extending from the greater diameter end of the tapered outer surface and defining outer threads thereabout. A nut is provided having a first axial portion defining inner threads for engaging the outer threads of the first extension portion. The nut further includes a second axial portion including an arcuate engaging lip for mating with the circumferential receiving groove of the second extension portion. The arcuate engaging lip is preferably no more than approximately semicircular in extent. The nut is configured in this case having an appropriate mass-excised portion to achieve rotational balance.

20 Claims, 4 Drawing Sheets

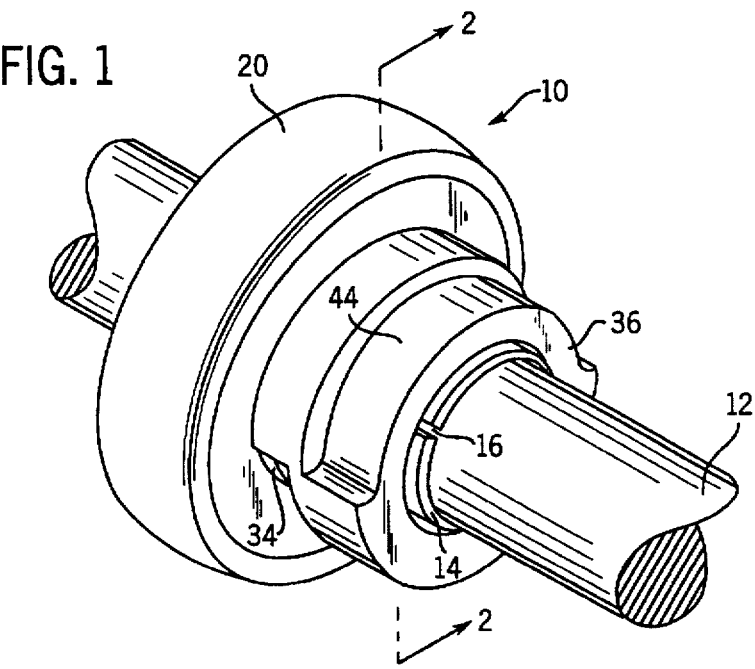
FIG. 1
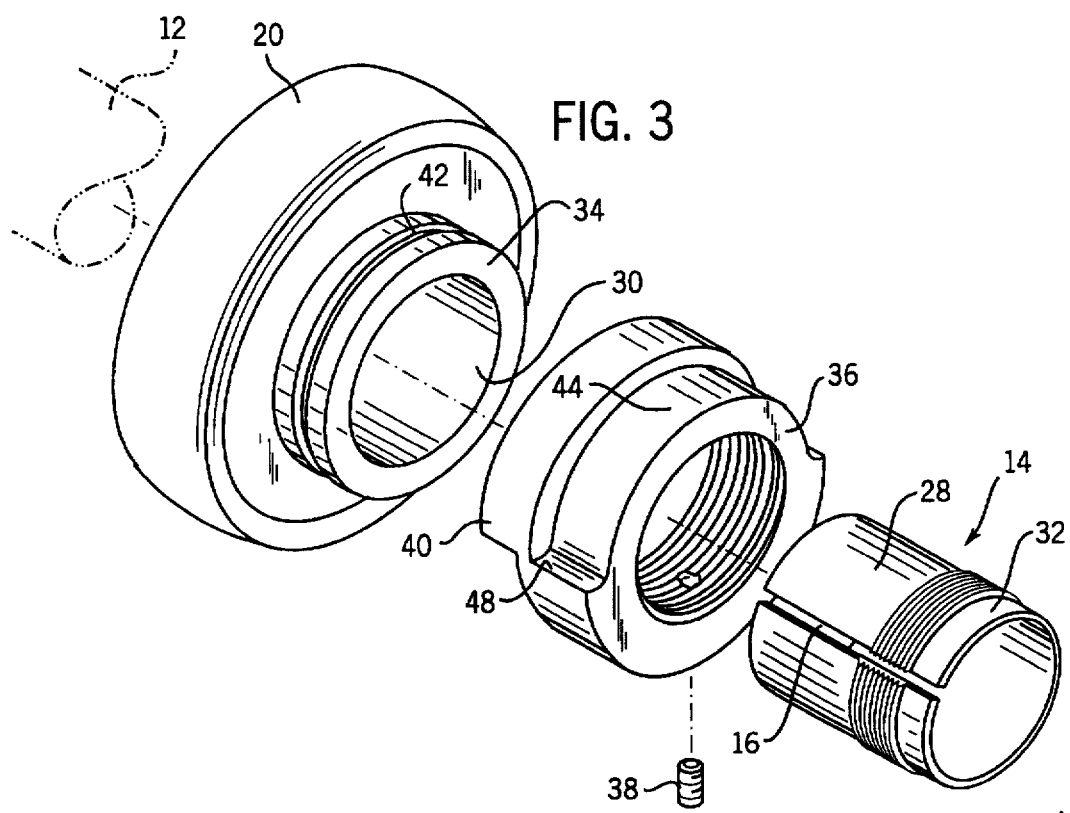
FIG. 3
FIG. 1

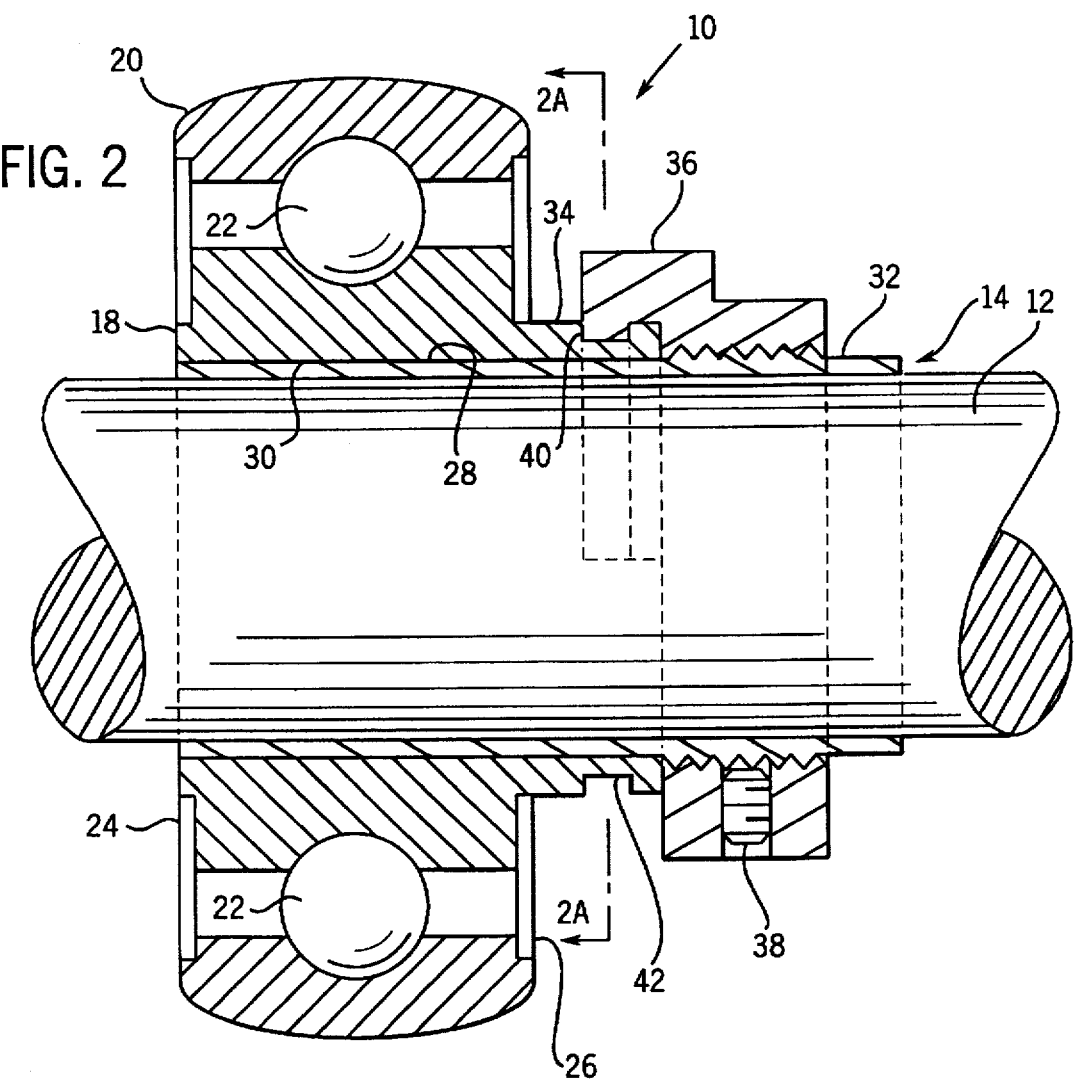
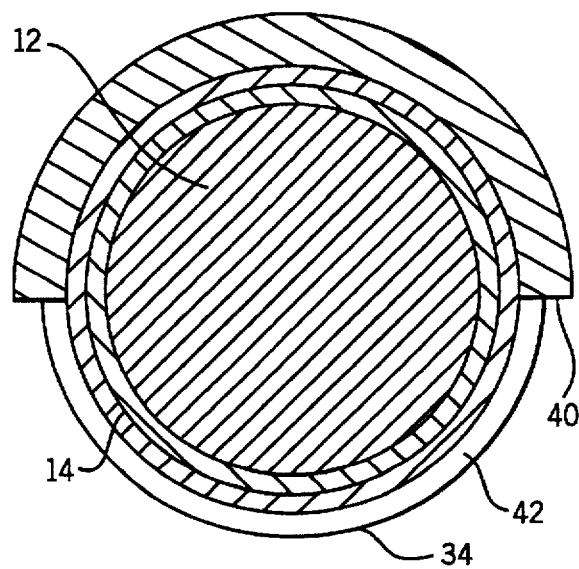

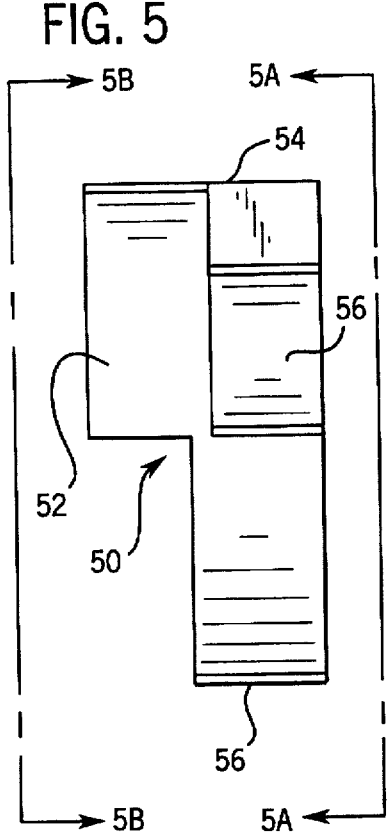
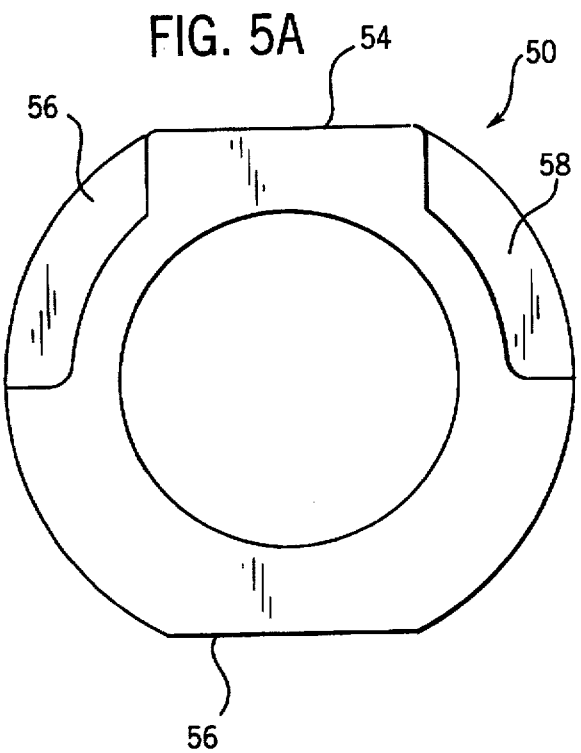
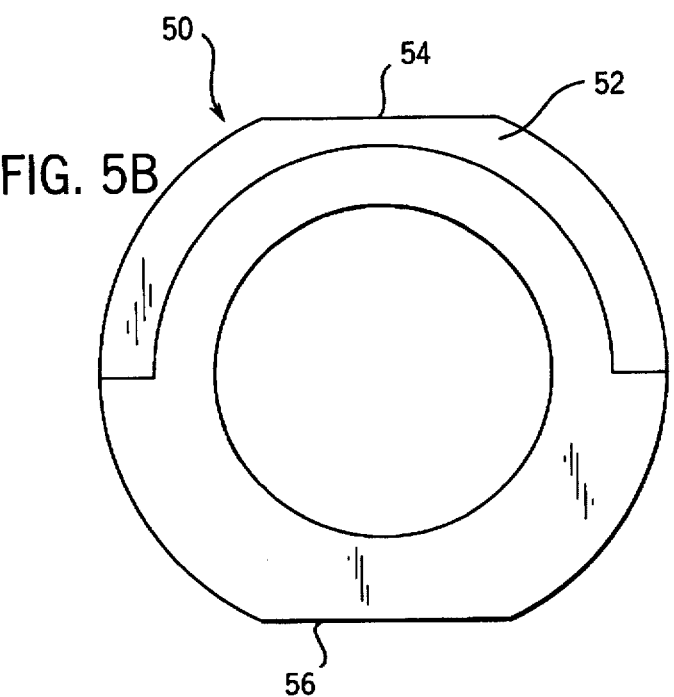

BEARING ASSEMBLY UTILIZING IMPROVED CLAMPING ARRANGEMENT

BACKGROUND OF THE INVENTION

The present invention relates generally to means for clamping a bearing assembly to an elongated shaft. More particularly, the invention relates to a bearing assembly incorporating an improved arrangement to effect securement thereof to a shaft.

Bearing assemblies are often designed to be quickly attached to a shaft. Typically, the bearing assembly is first slipped along the shaft to the desired position. Once there, the inner ring of the bearing assembly is secured to the shaft utilizing one of various clamping techniques.

A common clamping technique involves the use of a tapered adapter having a tapered outer surface. Such an adapter defines an axial bore for receipt of a shaft therethrough and further defines a radial slot extending along its length. A bearing assembly having a receiving bore with a tapered inner surface is situated about the tapered adapter. The bearing assembly and the tapered adapter are forced axially onto one another. As a result, the tapered adapter is closed around the shaft. Further movement of the bearing assembly along the tapered outer surface achieves a press fit between the various components.

Generally, bearing assemblies utilizing tapered adapters have been commercially available in two general types, a pull type and a push type. In the pull type, threads are defined on the tapered adapter adjacent its lesser diameter end. A lock nut is tightened onto the threads to "pull" the tapered adapter into the shaft bore of the bearing assembly.

A limitation of this pull-type design is the large cross section required to accommodate threads situated at the lesser diameter end of the tapered adapter. In addition, this design has often been difficult to disassemble. Specifically, a lack of convenient means to remove the bearing from the adapter has frequently resulted in destruction of the bearing during removal. This may result in lost equipment service due to the long removal time, as well as costs associated with any destruction of the bearing.

The push type adapter also has limitations in practical service. Specifically, this design has often required a special shoulder against which the bearing is abutted on one side. Further, threads are typically defined about the shaft for receiving a nut abutting the tapered adapter on the other side. As the nut is tightened, the tapered adapter is "pushed" into the shaft bore of the bearing assembly. Another nut must generally be provided to remove the adaptor from the bearing assembly and shaft. It will be appreciated that the special features of the shaft in this design contribute to considerable expense in manufacture and service.

SUMMARY OF THE INVENTION

The present invention recognizes and addresses the foregoing disadvantages, and others, of prior art constructions and methods. Accordingly, it is an object of the present invention to provide a bearing assembly having an improved clamping arrangement.

It is another object of the present invention to provide an improved clamping arrangement for securing a bearing to an elongated shaft.

It is a more particular object of the present invention to provide an improved clamping arrangement which facilitates securement and removal from the same axial side thereof.

It is another object of the present invention to provide a method for securing a bearing assembly to a shaft.

Some of these objects are achieved by a bearing assembly for receipt of a shaft therein. Such a bearing assembly comprises a tapered adapter defining a first axial bore for receipt of the shaft therethrough. The tapered adapter defines a tapered outer surface and is configured so as to permit contraction about the shaft. Exemplary embodiments are configured defining a longitudinal slot along the entire length of the tapered adapter for this purpose. A first extension portion extends from a greater diameter end of the tapered outer surface.

The bearing assembly also includes a bearing inner ring member having an inner raceway defined about an outer surface thereof. The inner ring member defines a second axial bore having a tapered inner surface for receipt of the tapered adapter therein. A second extension portion, defining a circumferential receiving groove, extends axially from a greater inner diameter portion of the tapered inner surface.

A bearing outer ring member defines an outer raceway about its inner surface. The bearing outer ring member is preferably situated so that the outer raceway is radially outward of the inner raceway of the bearing inner ring member. A plurality of bearing elements are disposed between the inner raceway and the outer raceway to permit relative rotation between the inner ring member and the outer ring member.

A nut is provided having a first axial portion for receipt around the first extension portion of the tapered adapter. Preferably, the first axial portion of the nut may define inner threads for engaging outer threads defined on the first extension portion. A second axial portion of the nut is axially received around the second extension portion of the bearing inner ring member. The second axial portion defines an arcuate engaging lip having an angular extent that is no more than approximately semicircular. The engaging lip is configured to operatively engage the circumferential receiving groove of the second extension portion. As a result, the nut interconnects the tapered adapter and the bearing inner ring member to effect relative axial movement therebetween.

Preferably, the nut is configured to be rotationally balanced about the shaft when it is operatively installed thereon. In an exemplary construction, the first axial portion of the nut thus defines a mass-excised portion in a region adjacent the engaging lip. The mass of an approximately semicircular portion of the nut that includes the engaging lip and the mass-excised portion is approximately equivalent to the mass of the remainder of the nut. Stated differently, the mass-excised portion is configured to compensate for the mass of the engaging lip during rotation of the nut.

In some exemplary embodiments, the mass-excised portion may be configured as an arcuate trough having respective end faces facilitating installation and removal of the nut. In other exemplary embodiments, the first axial portion of the nut is defined having the mass-excised portion configured as a first flat portion having respective generally symmetrical trough-like regions on each side thereof. In such embodiments, the first axial portion of the nut preferably defines a second flat portion located opposite the first flat portion. The flat portions facilitate use of a wrench to install or remove the nut, when desired.

In exemplary constructions, the engaging lip defines a first lip portion nearer to the first axial portion of the nut and a second lip portion defining an axial end of the second axial portion. The inner diameter of the first lip portion is greater than the outer diameter of the second extension portion, whereas the inner diameter of the second lip portion is less.

Other objects of the invention are achieved by a clamping arrangement for securement to an elongated shaft. The clamping arrangement comprises a tapered adapter defining an axial bore for receipt of the shaft therethrough. The tapered adapter has a first end of lesser diameter and a second end of greater diameter than the first end. A first extension portion axially extends from one of the first end or the second end of the tapered adapter.

The clamping arrangement further includes an annular element having an axial bore for receipt of the tapered adapter therein. The annular element defines a tapered inner surface extending between a third end of greater diameter and a fourth end of lesser diameter than the third end. Furthermore, the annular element has a second extension portion axially extending from one of the third end or the fourth end so that the second extension portion is proximate the first extension portion during use.

A nut is provided having a first axial portion for receipt around the first extension portion of the tapered adapter. The nut further includes a second axial portion for receipt around the second extension portion of the annular element.

One of the first extension portion of the tapered adapter and the second extension portion of the annular element defines threads about an outer surface thereof. Similarly, one of the first axial portion and the second axial portion has threads about an inner surface to engage the corresponding outer threads.

In addition, one of the first extension portion and the second extension portion defines a circumferential first mating element about an outer surface thereof. One of the first axial portion or the second axial portion has a second mating element extending no more than half the circumference of the nut. This second mating element is operatively connected during use with the first mating element and is configured such that rotation of the nut allows for relative axial movement between the tapered adapter and the annular element.

In some exemplary constructions, the first extension portion axially extends from the second end of the tapered adapter and the second extension portion axially extends from the third end of the annular element. Additionally, threads may be defined on the first extension portion, with the first mating element being associated with the second extension portion.

Other objects of the invention are achieved by a method for securing a bearing assembly to a shaft. A first step of the method involves providing apparatus comprising a tapered adapter defining a first axial bore for receipt of the shaft therethrough. The tapered adapter has a radial slot extending along the length thereof and defines a tapered outer surface. A first extension portion, axially extending from a greater diameter end of the tapered outer surface, has outer threads defined thereabout.

The apparatus further includes a bearing assembly having an inner ring member defining a second axial bore. The second axial bore has a tapered inner surface for receipt of the tapered adapter therein. A second extension portion, axially extending from a greater diameter portion of the tapered inner surface, defines a receiving groove about the outer surface thereof. A nut is provided having a first axial portion for receipt about the first extension portion and a second axial portion for receipt about the second extension portion. The first axial portion defines interior threads and the second axial portion defines an arcuate engaging lip.

In securing the bearing assembly, the nut is positioned such that the engaging lip of the second axial portion is hooked into the receiving groove of the second extension portion of the inner ring member. A combination of the nut and the bearing assembly is placed on the tapered adapter such that the tapered outer surface and the tapered inner surface are generally complementary. A combination of the nut, the bearing assembly and the tapered adapter is then moved into a desired position on the shaft. Next, the nut is rotated to effect relative axial movement between the inner ring member and the tapered adapter such that the bearing assembly is secured to the shaft.

Other objects, features and aspects of the present invention are achieved by various combinations and subcombinations of the disclosed elements, and will be apparent to those of ordinary skill in the art based on the discussion below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 1 is a perspective view of a preferred embodiment of a bearing assembly constructed in accordance with the present invention as mounted on a shaft;

FIG. 2 is a partial cross-sectional view as taken along line 2—2 of FIG. 1;

FIG. 2A is a cross-sectional view as taken along line 2A—2A of FIG. 2;

FIG. 3 is an exploded view of the bearing assembly shown in FIG. 1 as removed from the shaft;

FIG. 5 is a side elevational view of an alternative nut embodiment which may be utilized in the bearing assembly of FIG. 1;

FIG. 5A is an elevational view as taken along line 5A—5A of FIG. 5; and

FIG. 5B is an elevational view as taken along line 5B—5B of FIG. 5.

Figure 4:
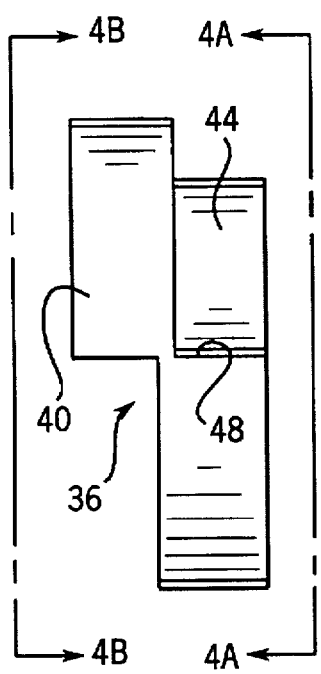
FIG. 4 is a side elevational view of the nut utilized in the bearing assembly of FIG. 1.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Referring now to FIGS. 1 and 2, a bearing assembly (generally indicated at 10) constructed in accordance with the invention is shown secured to a rotatable shaft 12. Bearing assembly 10 includes a tapered adapter 14 defining an axial slot 16 along its length to permit contraction about shaft 12. A bearing inner ring member 18, defining an inner raceway about its outer circumferential surface, is received about tapered adapter 14 in the illustrated manner.

Bearing assembly 10 further includes a bearing outer ring member 20 defining an outer raceway about its inner circumferential surface. A plurality of suitable bearing elements, such as roller bearings or the illustrated ball bearings 22, are situated between the inner raceway of inner ring member 18 and the outer raceway of outer ring member 20. The bearing elements facilitate relative rotation between inner ring member 18 and outer ring member 20 in a well known manner.

In the illustrated embodiment, bearing assembly 10 is constructed as a bearing insert such as may be utilized with a suitable bearing housing, such as a pillow block housing or a flange housing. It should be appreciated that outer ring member 20 may be integral with the bearing housing in some embodiments of the invention.

Bearing assembly 10 further includes seal members 24 and 26 respectively located on opposite axial sides of the bearing elements. Seal members 24 and 26 are each attached to one of inner ring member 18 or outer ring member 20, but not the other. As such, seal members 24 and 26 will rotate with the ring member to which they are attached while defining a chamber to maintain lubricant around the bearing elements. Seal members 24 and 26 will also serve to exclude undesirable extraneous matter.

Tapered adapter 14 includes a first end of lesser diameter extending into a second end of greater diameter to define a tapered outer surface 28. A tapered inner surface 30, generally complementary to tapered outer surface 28, is defined within the bore of inner ring member 18. Engagement of tapered inner surface 28 and tapered outer surface 30 causes contraction of tapered adapter 14 such that bearing assembly 10 will be secured to shaft 12.

Tapered adapter 14 further includes an extension portion 32 axially extending from the larger diameter end of tapered outer surface 28. Similarly, inner ring member 18 includes an extension portion 34 axially extending from the larger diameter end of tapered inner surface 30. A nut 36 includes a first axial portion having inner threads for engaging outer threads defined about extension portion 32.

As will be described more fully below, nut 36 is suitably connected to inner ring member 18 via extension portion 34 such that axial movement of nut 36 will cause corresponding axial movement of inner ring member 18. Specifically, tightening of nut 36 will cause tapered outer surface 28 and tapered inner surface 30 to be moved into engagement. Rotation of nut 36 in the opposite direction will cause tapered outer surface 28 and tapered inner surface 30 to be moved out of engagement. A radial set screw 38, threadably received in nut 36 as shown, may be engaged against the outer threads of extension portion 32 after nut 36 is tightened.

Referring now also to FIG. 3, the manner in which nut 36 may be connected to inner ring member 18 will be described. As can be seen, nut 36 further includes a second axial portion integrally defining an arcuate engaging lip 40. Engaging lip 40 mates with a circumferential receiving groove 42 defined in the outer surface of extension portion 34. As a result of this arrangement, nut 36 will be free to rotate with respect to inner ring member 18 as it is received onto the threads of extension portion 32.

Preferably, engaging lip 40 extends no more than half the circumference around nut 36. In other words, the arc of engaging lip 40 is preferably no greater than semicircular, as can be seen clearly in FIG. 2A. As much, nut 36 will be easily connectable to inner ring member 18 when bearing assembly 10 is to be operatively secured. Specifically, engaging lip 40 may be hooked onto groove 42 during assembly, thereby effecting engagement of the respective mating elements. At the same time, nut 36 may be advantageously constructed as a unitary element instead of a split nut as in some past arrangements. Likewise, nut 36 can be easily separated from inner ring member 18 when bearing assembly 10 is removed from shaft 12.

Figure 4A:
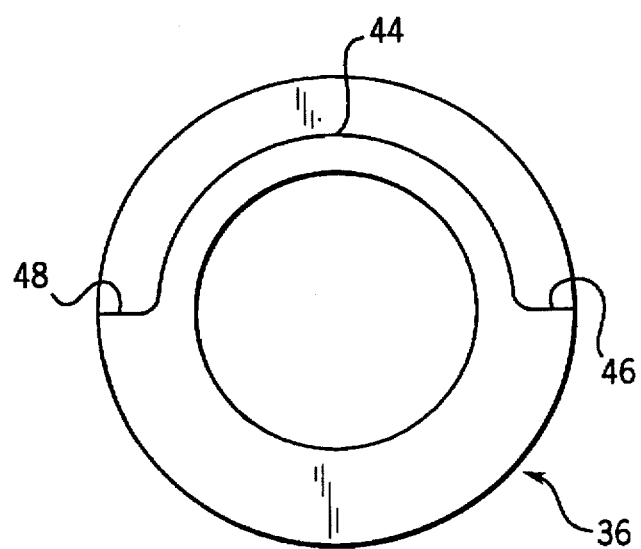
FIG. 4A is an elevational view as taken along line 4A—4A of FIG. 4.
Figure 4B:
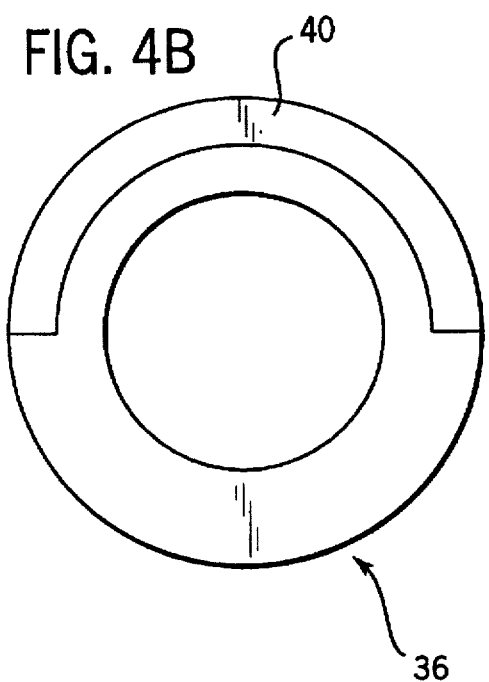
FIG. 4B is an elevational view as taken along line 4B—4B of FIG. 4.

The overall configuration of nut 36 may be explained with reference to FIGS. 4, 4A and 4B. It will be appreciated that the addition of a semicircular engaging lip to a nut that is otherwise rotationally balanced will cause the resulting nut to be unbalanced. To compensate for the additional mass introduced by engaging lip 40, nut 36 defines an adjacent mass-excised portion 44. Mass-excised portion 44 is configured so that the total mass of the semicircular portion of nut 36 that includes engaging lip 36 and mass-excised portion 44 will be approximate equal to the mass of the remainder of nut 36. As a result, rotational balance will be achieved.

Mass-excised portion 44 may have any configuration that achieves the desired balance in nut 36. In some presently preferred embodiments, however, mass-excised portion 44 is configured in a manner that also facilitates installation and removal of bearing assembly 10. As shown in FIG. 4A, mass-excised portion 44 defines an arcuate trough having respective trough faces 46 and 48 against which a suitable tapping tool may be engaged. For example, a screwdriver may be engaged against face 46 when nut 36 is to be tightened. The screwdriver may be tapped with a hammer or the like when hand tightening becomes difficult. Likewise, the tapping tool may be engaged against face 48 when nut 36 is to be loosened.

FIGS. 5, 5A and 5B illustrate an alternative embodiment of the securement nut, indicated generally at 50. Similar to nut 36, nut 50 also has an arcuate engaging lip 52 that is preferably no more than semicircular in extent. Unlike nut 36, however, nut 50 is configured defining flats 54 and 56 at respective opposite locations on the circumference thereof. Flats 54 and 56 facilitate use of a typical wrench in the tightening and loosening of nut 50. In this case, the mass-excised portion defines a pair of generally symmetrical trough-like regions 56 and 58 on respective opposite sides of flat 54.

While presently preferred embodiments of the invention and presently preferred methods of practicing the same have been shown and described, modifications and variations may be made thereto by those of ordinary skill in the art without departing from the spirit and scope of the present invention, which is more particularly set forth in the appended claims. For example, various holes or slots may be utilized to achieve mass balancing in the nut in lieu of the trough configurations shown above. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly for receipt of a shaft therein, said bearing assembly comprising:

a tapered adapter defining a first axial bore for receipt of the shaft therethrough and being configured to permit contraction about said shaft, said tapered adapter further defining a tapered outer surface and including a first extension portion axially extending from a greater diameter end of said tapered outer surface;

a bearing inner ring member defining an inner raceway about an outer surface thereof and further defining a second axial bore having a tapered inner surface for receipt of said tapered adapter therein, said bearing inner ring member including a second extension portion axially extending from a greater diameter portion of said tapered inner surface, said second extension portion defining a circumferential receiving groove;

a bearing outer ring member defining an outer raceway about an inner surface thereof, said bearing outer ring member situated such that said outer raceway is situated in opposition to said inner raceway;

a plurality of bearing elements disposed between said inner raceway and said outer raceway; and a nut having a first axial portion for receipt around said first extension portion and a second axial portion for receipt around said second extension portion, said second axial portion of said nut defining an arcuate engaging lip having an angular extent no more than approximately semicircular, said engaging lip configured to operatively engage said circumferential receiving groove such that said nut interconnects said tapered adapter and said bearing inner ring member to effect relative axial movement therebetween.

2. A bearing assembly as set forth in claim 1, wherein said nut is configured to be rotationally balanced about said shaft when operatively installed thereon.

3. A bearing assembly as set forth in claim 2, wherein said first axial portion is configured defining a mass excised portion in a region adjacent said engaging lip such that a mass of an approximately semicircular portion of said nut including said engaging lip and said mass excised portion is approximately equivalent to a mass of a remainder of said nut.

4. A bearing assembly as set forth in claim 1, wherein said first axial portion defines a mass-excised portion configured to compensate for a mass of said engaging lip during rotation of the nut.

5. A bearing assembly as set forth in claim 4, wherein said mass excised portion of said first axial portion is configured as an arcuate trough having respective end faces facilitating installation and removal of said nut.

6. A bearing assembly as set forth in claim 4, wherein said nut is configured having a first flat portion and further having a second flat portion located opposite said first flat portion, said nut including respective generally symmetrical trough-like regions on each side of said first flat portion.

7. A bearing assembly as set forth in claim 1, wherein said engaging lip is defined having a first lip portion nearer to the first axial portion of said nut and a second lip portion defining an axial end of said second axial portion, said first lip portion having an inner diameter greater than an outer diameter of said second extension portion, said second lip portion having a smaller inner diameter than said outer diameter of said second extension portion.

8. A bearing assembly as set forth in claim 1, wherein said first extension portion of said tapered adapter defines outer threads and said first axial portion of said nut defines inner threads, said outer threads operatively engaging said inner threads.

9. A bearing assembly as set forth in claim 1, wherein said nut comprises a unitary nut having said first axial portion and said second axial portion.

10. A clamping arrangement for securement to an elongated shaft, said clamping arrangement comprising:

a tapered adapter defining an axial bore for receipt of the shaft therethrough, said tapered adapter further defining a tapered outer surface extending between a first end of lesser diameter and a second end of greater diameter than said first end, said tapered adapter further having a first extension portion axially extending from one of said first end and said second end;

an annular element defining an axial bore for receipt of said tapered adapter therein, said annular element further defining a tapered inner surface extending between a third end of greater diameter and a fourth end of lesser diameter than said third end, said annular element further having a second extension portion axially extending from one end of said third end and said fourth end such that said second extension portion will be proximate to said first extension portion during use;

one of said first extension portion and said second extension portion defining a circumferential first mating element about an outer surface thereof, another of said first extension portion and said second extension portion defining threads about an outer surface thereof;

a nut having a first axial portion for receipt around said first extension portion and a second axial portion for receipt around said second extension portion; and one of said first axial portion and said second axial portion having threads defined about an inner surface thereof for engaging said threads defined on a corresponding one of said first extension portion and said second extension portion, another of said first axial portion and said second axial portion defining a second mating element extending about no more than approximately half a circumference of said nut, said second mating element operatively connected in use with said first mating element and being configured such that rotation of said nut will effect relative axial movement between said tapered adapter and said annular element.

11. A clamping arrangement as set forth in claim 10, wherein said first extension portion axially extends from said second end of said tapered adapter and said second extension portion axially extends from said third end of said annular element.

12. A clamping arrangement as set forth in claim 10, wherein said threads are defined on said first extension portion and said first mating element is defined about said second extension portion.

13. A clamping arrangement as set forth in claim 12, wherein said nut is configured to be rotationally balanced about said shaft when operatively installed thereon.

14. A clamping arrangement as set forth in claim 13, wherein said first axial portion is configured defining a mass-excised portion in a region adjacent said second mating element such that a mass of an approximately semicircular portion of said nut including said second mating element and said mass-excised portion is approximately equivalent to a mass of a remainder of said nut.

15. A clamping arrangement as set forth in claim 13, wherein said nut is configured having a first flat portion and further having a second flat portion located opposite said first flat portion, said nut including respective generally symmetrical trough-like regions on each side of said first flat portion.

16. A clamping arrangement as set forth in claim 10, wherein said first axial portion defines a mass-excised portion configured to compensate for a mass of the second mating element during rotation of said nut.

17. A clamping arrangement as set forth in claim 16, wherein said mass-excised portion of said first axial portion is configured as an arcuate trough having respective end faces facilitating installation and removal of said nut.

18. A clamping arrangement as set forth in claim 10, wherein said first mating element comprises a circumferential groove and said second mating element comprises an arcuate engaging lip.

19. A clamping arrangement as set forth in claim 18, wherein said circumferential groove is defined about second extension portion and said arcuate engaging lip is integrally defined by said second axial portion.

20. A method for securing a bearing assembly to a shaft, said method comprising the steps of:

(a) providing apparatus comprising:
 (1) a tapered adapter defining a first axial bore for receipt of the shaft therethrough and having a radial slot extending along the length thereof, said tapered adapter further defining a tapered outer surface and including a first extension portion axially extending from a greater diameter end of said tapered outer surface, said first extension portion defining outer threads thereabout;
 (2) a bearing assembly including an inner ring member defining a second axial bore having a tapered inner surface for receipt of said tapered adapter therein, said bearing inner ring member including a second extension portion axially extending from a greater diameter portion of said tapered inner surface, said second extension portion defining a receiving groove about an outer surface thereof;
 (3) a nut having a first axial portion for receipt about said first extension portion and a second axial portion for receipt about said second extension portion, said first axial portion defining interior threads and said second axial portion defining an arcuate engaging lip; and (b) placing said nut on said bearing assembly such that the engaging lip of the second axial portion is hooked into the receiving groove of the second extension portion of the inner ring member;

(c) placing a combination of said nut and said bearing assembly on said tapered adapter such that said tapered outer surface and said tapered inner surface are generally complementary;

(d) moving a combination of said nut, said bearing assembly, and said tapered adapter into a desired position on said shaft; and (e) rotating said nut to effect relative axial movement between said inner ring member and said tapered adapter such that said tapered adapter is pushed into said inner ring member and said bearing assembly is thereby secured to said shaft.

* * * * *